UNITED STATES PATENT OFFICE.

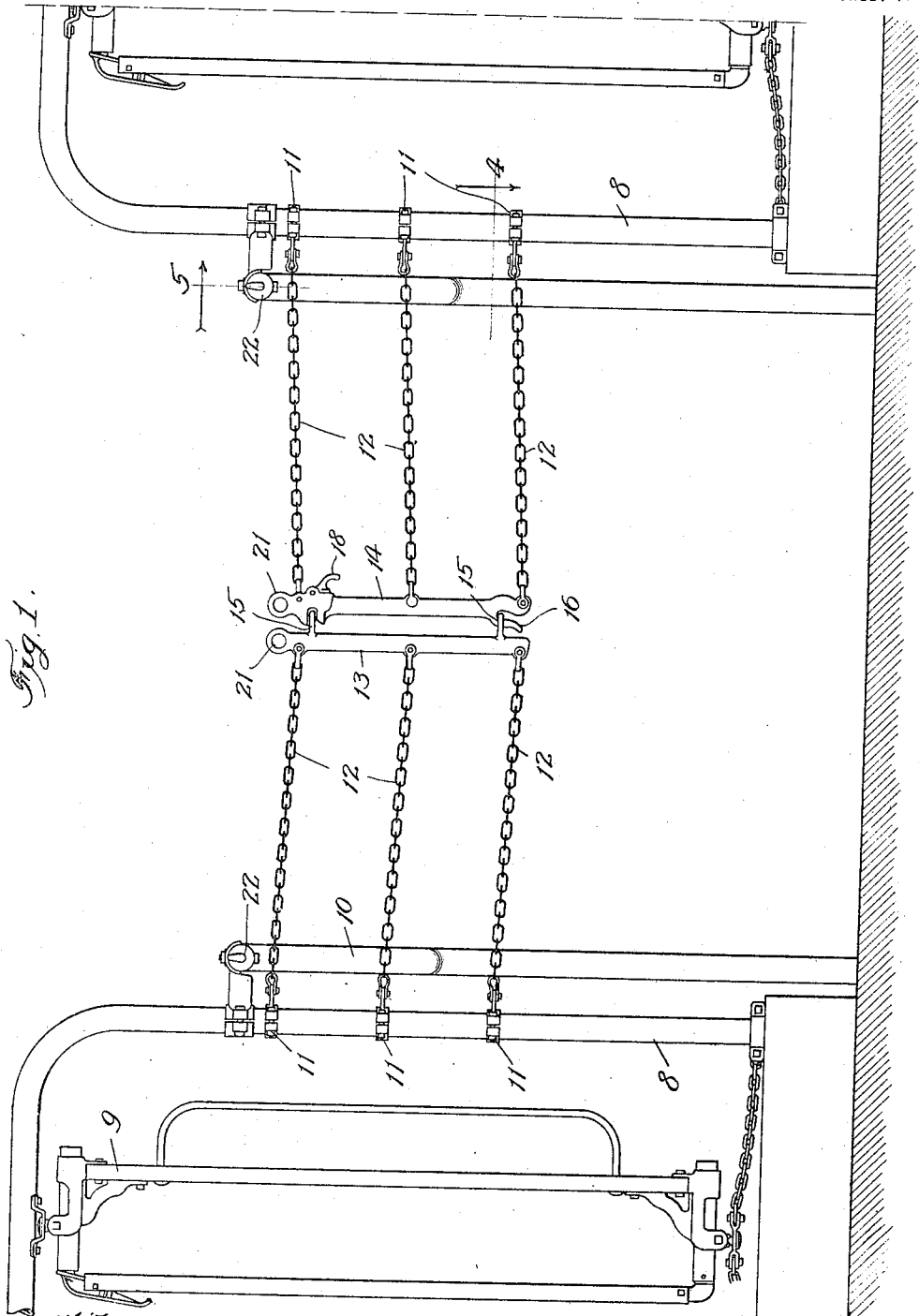

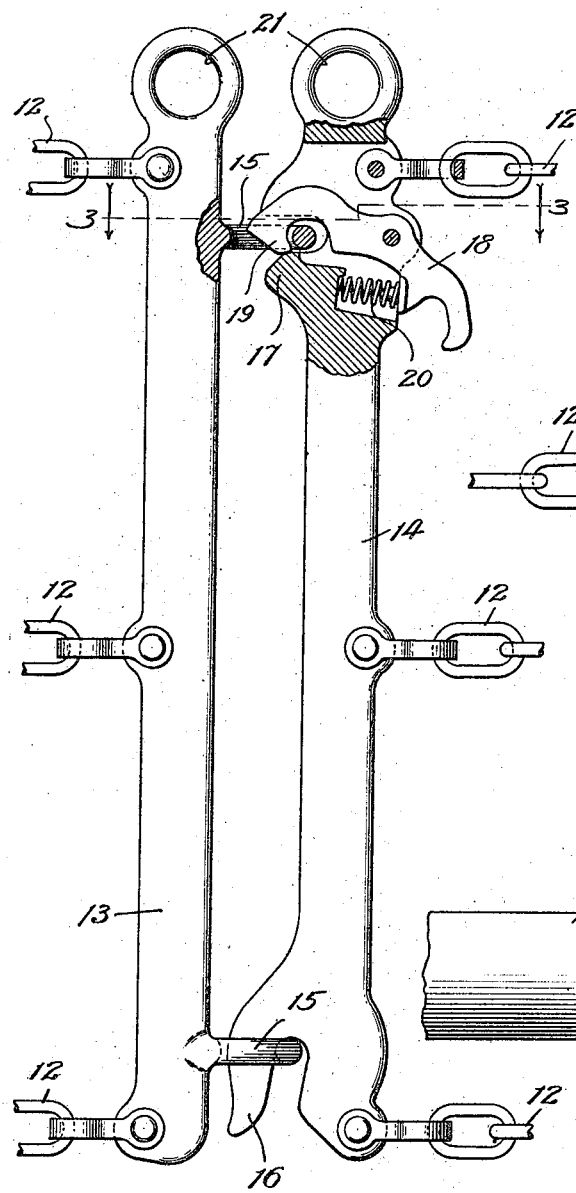
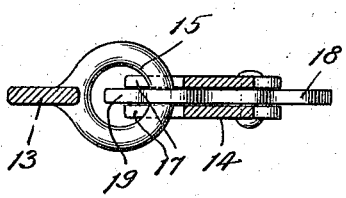
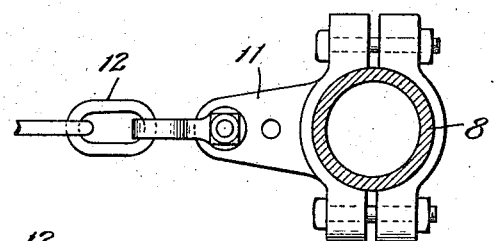
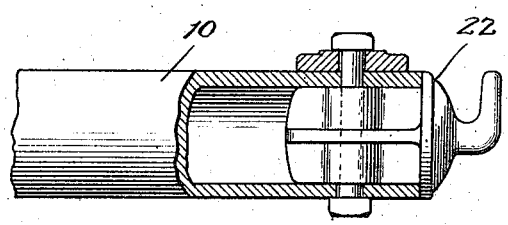

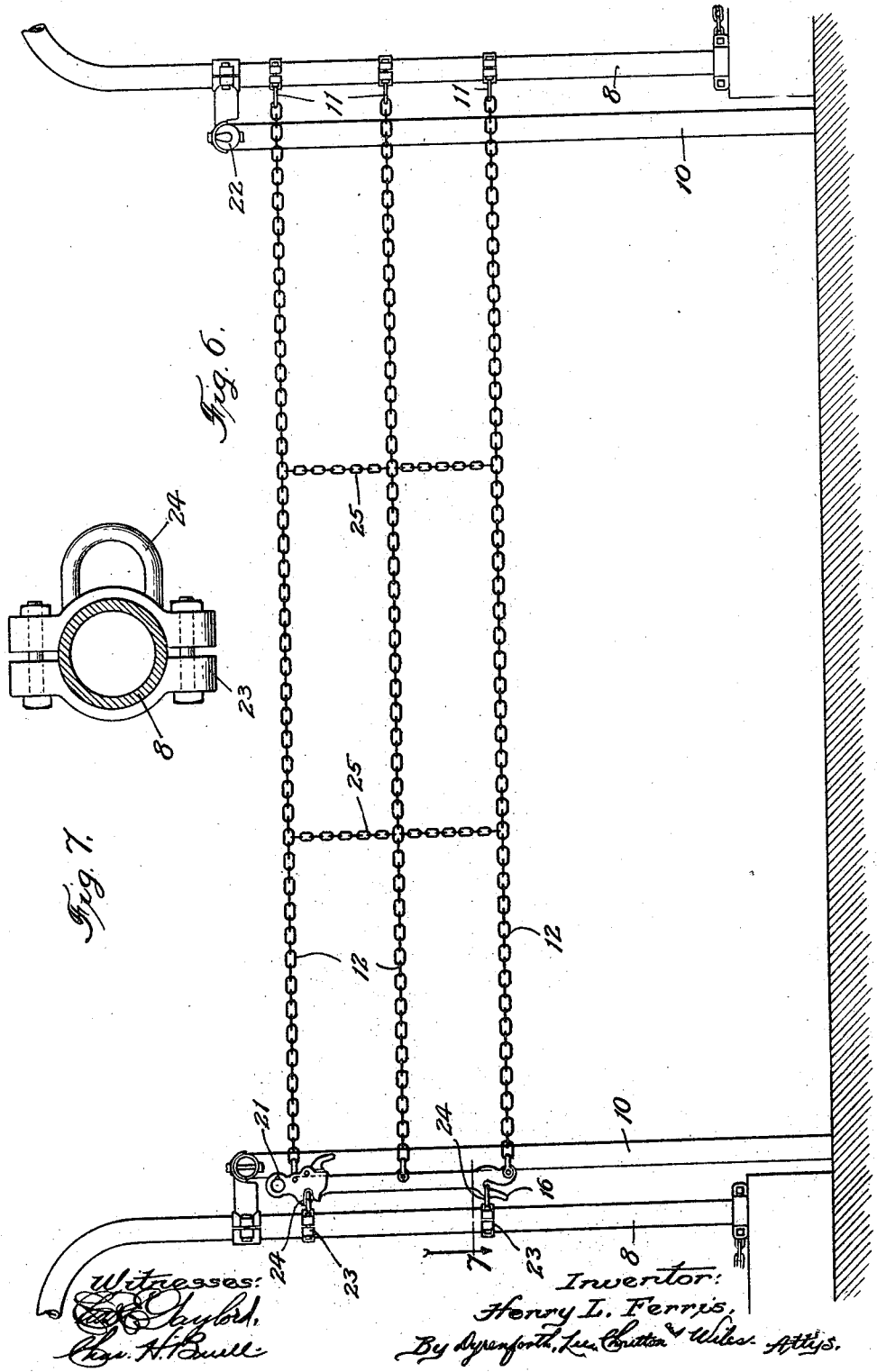

HENRY L. FERRIS, OF HARVARD, ILLINOIS, ASSIGNOR TO HUNT, HELM, FERRIS & CO., OF HARVARD, ILLINOIS, A CORPORATION OF ILLINOIS.

GATE FOR STALL CONSTRUCTION.

1,241,364.  Specification of Letters Patent.  Patented Sept. 25, 1917.

Application filed December 26, 1916.  Serial No. 138,810.

*To all whom it may concern:*

Be it known that I, HENRY L. FERRIS, a citizen of the United States, residing at Harvard, in the county of McHenry and State of Illinois, have invented a new and useful Gate for Stall Construction, of which the following is a specification.

My invention relates to certain new and useful improvements in a gate for stall construction, and is fully described and explained in the specification and shown in the accompanying drawings, in which—

Figure 1 is an elevation of my improved gate; Fig. 2 is a detailed elevation of the connecting means between the gate sections; Fig. 3 is a horizontal section on the broken line 3 of Fig. 2; Fig. 4 is a horizontal section on the line 4 of Fig. 1; Fig. 5 is a vertical section on the line 5 of Fig. 1; Fig. 6 is an elevation similar to Fig. 1 of a modified form of construction; and Fig. 7 is a horizontal section on the line 7 of Fig. 6.

Referring to the drawings, 8 are stall-frames of ordinary form, carrying stanchions 9 and separated by partitions 10 of ordinary form. Secured to the stall-frames 8 are vertically adjustable collars 11, which support a plurality of chain lengths 12 which form the body of the gate structure. At the free ends of the chain lengths on the two sides are vertical bars 13 and 14. The bar 13 is provided with horizontal eyes 15. The bar 14 has at its lower end a hook 16 adapted to hook over the lower eye 15. At its upper end the bar 14 is provided with a beveled notched ear 17, into which the upper eye 15 can enter, and the bar is slotted in the plane of these ears to receive a latch 18 having a beveled hook 19 to engage the upper eye 15 when it lies in the notch, and spring-pressed so as normally to be in engaging position by a spring 20. The two bars 13 and 14 can thus be mutually engaged to close the gate by placing the hook 16 in the lower eye 15 and then swinging the upper ends of the bars together, when they will snap and latch. The latch can be released and the bars separated to open the gate in an obvious way. When the gate is opened the structure is held in a convenient, out-of-the-way position by hooking eyes 21, at the upper ends of the bars 13 and 14, over hooks 22 carried by the ends of the partitions, as shown in Fig. 5.

The present device is peculiarly advantageous for use in connection with metal stall construction because it possesses a considerable capacity for adjustment and therefore requires no accurate fitting. A slight variation in the tension on the chains is immaterial and this variation will take up variations in length equivalent to the length of a single link of chain. The cutting out of a link of chain is a very small matter and therefore this gate can be installed with great ease. This is of great importance because metal stalls which are made in the factory have to be set up with greatest accuracy in order to have their parts interfit. This is usually accomplished by employing templets for spacing the stall-supports accurately on the curb, although recently stalls adjustable along the curb have been provided. However, the space available between two separate series of stalls and which provides a passageway for the cattle is usually closed by a gate which ought to be furnished by the factory at the same time the rest of the equipment is installed. It is obvious, however, that all errors in the measurement or computation of the space occupied by the stalls come out in this one space between the two series of stalls, and the fitting of gates in position has given endless trouble both to the manufacturers of equipment and to the contractors who erect the stalls. The present gate, on the contrary, is entirely satisfactory in operation, and it requires no extremely accurate measurement.

A single flexible member extending across the passageway is entirely insufficient for the purpose, because if spaced low enough that the cattle cannot push under it, it is often overlooked and tripped over. The gate must be built with a series of flexible members arranged one above the other, so as to give a considerable degree of vertical continuity to the structure, and the present arrangement is peculiarly desirable.

The modified form of construction, shown in Figs. 6 and 7, is designed for use where the space between the stalls is abnormally wide, say in the neighborhood of ten feet. The preferred form of construction is used where the space to be covered is sufficiently narrow that the operator can easily hold one vertical bar, say the bar 13, in position in the middle of the passage and can reach with his free hand to the other end to unhook the other bar, say the bar 14. When the space approaches ten feet, however, the operator when holding one side of the gate fully extended cannot very conveniently reach the other side of the gate hanging in position on the opposite stall, and for such cases the structure is modified by making the flexible members extend entirely from one side to the other, only the bar 14 being employed. In this case collars 23, having eyes 24, are placed on the opposite stall-frame, and the gate is brought entirely across the passageway to that side and fastened with the eyes as heretofore explained. In this case, also, the chain-gate is given a greater continuity by vertical chains 25.

I realize that considerable variation is possible in the details of construction herein shown, and I do not intend to limit myself thereto, except as pointed out in the following claims, in which it is my intention to claim all the novelty inherent in the device as broadly as is permitted by the state of the art.

What I regard as new and desire to secure by Letters Patent is—

1. In combination, two supporting posts flanking a passageway and a gate extending therebetween formed of a plurality of flexible chain-like members adjustably secured at one end to the upper part of one post and two mutually engageable sets of fastening means one of which is adjustably supported from the upper part of one post and the other at the ends of said flexible chain-like members whereby on disconnecting said members they will automatically drop relatively away from each other to open said passageway.

2. In combination two supporting posts separated by a passageway, a gate for closing said passageway comprising two sets of flexible chain-like members adjustably secured to the upper parts of said posts and two mutually engageable sets of fastening means carried by the adjacent ends of said flexible members, one of said fastening means consisting of eyes and the other a hook and a spring locked latch adapted to coact with said eyes.

3. In combination two supporting posts separated by a passageway, a gate for closing said passageway comprising a plurality of flexible members adjustably secured to the upper part of each of said posts and having at their free ends a vertical bar and two mutually engageable sets of fastening means associated with said bars including eyes and coacting hook and latch elements.

4. In combination two supporting posts separated by a passageway, a gate for closing said passageway comprising a plurality of flexible members adjustably secured to the upper part of each of said posts and having at their free ends a vertical bar and two mutually engageable sets of fastening means associated with said bars including two eyes on one bar and coacting hook and latch elements, carried by the other bar.

5. In combination two supporting posts separated by a passageway, two gate sections each formed of a plurality of horizontally disposed flexible members connected together intermediate their ends and supported at one end to the upper part of the posts, two vertical bars associated with the adjacent free ends of said flexible members, eyes on one of said bars and a hook and a spring actuated beveled latch on the other bar adapted to coact with said eyes whereby the bars may be pressed together and locked in closed position, said bars being so supported that when the latch is released the gate sections will automatically drop to one side to open the passageway.

In testimony whereof I have hereunto set my hand this 20th day of December, 1916.

HENRY L. FERRIS.

Copies of this patent may be obtained for five cents each, by addressing the "Commissioner of Patents, Washington, D. C."